(12) United States Patent
Yamauchi

(10) Patent No.: US 11,898,838 B2
(45) Date of Patent: Feb. 13, 2024

(54) ADJUSTMENT METHOD AND MEASUREMENT METHOD

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 253 days.

(21) Appl. No.: 17/540,855

(22) Filed: Dec. 2, 2021

(65) Prior Publication Data
US 2022/0182519 A1    Jun. 9, 2022

(30) Foreign Application Priority Data

Dec. 3, 2020    (JP) .................................. 2020-201006

(51) Int. Cl.
*G01B 11/25*    (2006.01)
*G06T 7/521*    (2017.01)

(52) U.S. Cl.
CPC .......... *G01B 11/2513* (2013.01); *G06T 7/521* (2017.01); *G06T 2207/10152* (2013.01)

(58) Field of Classification Search
None
See application file for complete search history.

(56) References Cited

U.S. PATENT DOCUMENTS

| | | | |
|---|---|---|---|
| 9,052,584 B2 * | 6/2015 | Majumder | G03B 37/04 |
| 2004/0070565 A1 * | 4/2004 | Nayar | G06V 10/60 |
| | | | 345/156 |
| 2010/0091264 A1 | 4/2010 | Masuda | |
| 2014/0168662 A1 | 6/2014 | Takabayashi et al. | |
| 2018/0180407 A1 | 6/2018 | Inukai | |
| 2019/0392564 A1 * | 12/2019 | Sun | G06V 40/107 |
| 2020/0334895 A1 * | 10/2020 | Skotheim | G06T 15/205 |
| 2021/0291435 A1 * | 9/2021 | Fukuoka | B29C 64/227 |

FOREIGN PATENT DOCUMENTS

| | | |
|---|---|---|
| JP | 2005-214653 A | 8/2005 |
| JP | 2009-115612 A | 5/2009 |
| JP | 2010-096568 A | 4/2010 |
| JP | 2014-119442 A | 6/2014 |
| JP | 2018-105671 A | 7/2018 |

* cited by examiner

*Primary Examiner* — Talha M Nawaz
(74) *Attorney, Agent, or Firm* — Oliff PLC

(57) ABSTRACT

There is provided an adjustment method including, identifying correspondence between a projector coordinate system and a camera coordinate system, detecting brightness of a first area of a second captured image and brightness of a second area of the second captured image, estimating a range of first brightness of a third area of a second image, estimating a range of second brightness of a fourth area of the second image, and adjusting brightness of a fifth area corresponding to the third area in a projection image projected from the projector so as to fall within the range of the first brightness and adjusting brightness of a sixth area corresponding to the fourth area in the projection image so as to fall within the range of the second brightness.

7 Claims, 4 Drawing Sheets

ADJUSTMENT METHOD AND MEASUREMENT METHOD

The present application is based on, and claims priority from JP Application Serial Number 2020-201006, filed Dec. 3, 2020, the disclosure of which is hereby incorporated by reference herein in its entirety.

BACKGROUND

1. Technical Field

The present disclosure relates to an adjustment method, a measurement method, a projection system, an information processing apparatus, and a program.

2. Related Art

JP-A-2009-115612 discloses a technology for measuring the three-dimensional shape of a measurement target object based on a phase shift method using an image of a fringe pattern having sinusoidally changing brightness.

In the phase shift method, an image of the fringe pattern is projected onto the measurement target object. The three-dimensional shape of the measurement target object is then measured based on a captured image produced by capturing an image of the measurement target object with the image of the fringe pattern projected thereon. In the captured image of the measurement target object with the image of the fringe pattern projected thereon, the brightness of the fringe pattern varies in some cases from area to area even in the same captured image due, for example, to the reflection characteristics of the measurement target object or the external light. The accuracy of the measurement of the three-dimensional shape may decrease in an area of the captured image of the fringe pattern that is an area where the brightness does not fall within a proper brightness range, for example, the brightness of the fringe pattern is too high or too low.

SUMMARY

An adjustment method according to an aspect of the present disclosure for solving the problem described above is an adjustment method for adjusting a projection image projected from a projector onto a projection receiving object, the method including identifying correspondence between a projector coordinate system indicating a position in a first image and a camera coordinate system indicating a position in a first captured image based on the first image and the first captured image, the first image being projected from the projector onto the projection receiving object and the first captured image being produced by causing a first camera to capture an image of the projection receiving object with the first image projected thereon, detecting brightness of a first area of a second captured image produced by causing the first camera to capture an image of the projection receiving object with a second image projected thereon from the projector and brightness of a second area of the second captured image, estimating, for a third area of the second image that is an area associated with the first area in accordance with the correspondence, a range of first brightness that causes the brightness of the first area not to reach an upper or lower saturation point based on the detected brightness of the first area and brightness of the third area, estimating, for a fourth area of the second image that is an area associated with the second area in accordance with the correspondence, a range of second brightness that causes the brightness of the second area not to reach an upper or lower saturation point based on the detected brightness of the second area and brightness of the fourth area, and adjusting brightness of a fifth area corresponding to the third area in the projection image so as to fall within the range of the first brightness and adjusting brightness of a sixth area corresponding to the fourth area in the projection image so as to fall within the range of the second brightness.

A measurement method according to another aspect of the present disclosure for solving the problem described above is a measurement method for measuring a three-dimensional shape of a projection receiving object based on a captured image produced by causing a projector to project a projection image having periodically changing brightness in the image onto a projection receiving object and causing a first camera to capture an image of the projection receiving object with the projection image projected thereon and a captured image produced by causing a second camera different from the first camera to capture an image of the projection receiving object with the projection image projected thereon, the method including identifying correspondence between a projector coordinate system indicating a position in a first image and a camera coordinate system indicating a position in a first captured image based on the first image and the first captured image, the first image being projected from the projector onto the projection receiving object and the first captured image being produced by causing the first camera to capture an image of the projection receiving object with the first image projected thereon, detecting brightness of a first area and brightness of a second area of a second captured image produced by causing the first camera to capture an image of the projection receiving object with a second image projected thereon from the projector, estimating, for a third area of the second image that is an area associated with the first area in accordance with the correspondence, a range of first brightness that causes the brightness of the first area not to reach an upper or lower saturation point based on the detected brightness of the first area and brightness of the third area, estimating, for a fourth area of the second image that is an area associated with the second area in accordance with the correspondence, a range of second brightness that causes the brightness of the second area not to reach an upper or lower saturation point based on the detected brightness of the second area and brightness of the fourth area, and adjusting brightness of a fifth area corresponding to the third area in the projection image so as to fall within the range of the first brightness and adjusting brightness of a sixth area corresponding to the fourth area in the projection image so as to fall within the range of the second brightness.

A measurement method according to another aspect of the present disclosure for solving the problem described above is a measurement method for measuring a three-dimensional shape of a projection receiving object based on a projection image having periodically changing brightness in the image and a captured image produced by causing a projector to project the projection image onto a projection receiving object and causing a first camera to capture an image of the projection receiving object with the projection image projected thereon, the method including identifying correspondence between a projector coordinate system indicating a position in a first image and a camera coordinate system indicating a position in a first captured image based on the first image and the first captured image, the first captured image being produced by causing the first camera to capture an image of the projection receiving object with the first image projected thereon from the projector, detecting brightness of a first area and brightness of a second area of a second captured image produced by causing the first camera to capture an image of the projection receiving object with a second image projected thereon from the projector, estimating, for a third area of the second image that is an area associated with the first area in accordance with the correspondence, a range of first brightness that causes the brightness of the first area not to reach an upper or lower saturation point based on the detected brightness of the first area and brightness of the third area, estimating, for a fourth area of the second image that is an area associated with the second area in accordance with the correspondence, a range of second brightness that causes the brightness of the second area not to reach an upper or lower saturation point based on the detected brightness of the second area and brightness of the fourth area, and adjusting brightness of a fifth area corresponding to the third area in the projection image so as to fall within the range of the first brightness and adjusting brightness of a sixth area corresponding to the fourth area in the projection image so as to fall within the range of the second brightness.

A projection system according to another aspect of the present disclosure for solving the problem described above includes a projector that projects a projection image onto a projection receiving object, a first camera that captures an image of the projection receiving object, and an information processing apparatus. The information processing apparatus identifies correspondence between a projector coordinate system indicating a position in a first image and a camera coordinate system indicating a position in a first captured image based on the first image and the first captured image, the first captured image being produced by causing the first camera to capture an image of the projection receiving object with the first image projected thereon from the projector, detects brightness of a first area and brightness of a second area of a second captured image produced by causing the first camera to capture an image of the projection receiving object with a second image projected thereon from the projector, estimates, for a third area of the second image that is an area associated with the first area in accordance with the correspondence, a range of first brightness that causes the brightness of the first area not to reach an upper or lower saturation point based on the detected brightness of the first area and brightness of the third area, estimates, for a fourth area of the second image that is an area associated with the second area in accordance with the correspondence, a range of second brightness that causes the brightness of the second area not to reach an upper or lower saturation point based on the detected brightness of the second area and brightness of the fourth area, and adjusts brightness of a fifth area corresponding to the third area in the projection image so as to fall within the range of the first brightness and adjusts brightness of a sixth area corresponding to the fourth area in the projection image so as to fall within the range of the second brightness.

An information processing apparatus according to another aspect of the present disclosure for solving the problem described above identifies correspondence between a projector coordinate system indicating a position in a first image and a camera coordinate system indicating a position in a first captured image based on the first image and the first captured image, the first captured image being produced by causing a first camera to capture an image of a projection receiving object with the first image projected thereon from a projector that projects a projection image onto the projection receiving object, detects brightness of a first area and brightness of a second area of a second captured image produced by causing the first camera to capture an image of the projection receiving object with a second image projected thereon from the projector, estimates, for a third area of the second image that is an area associated with the first area in accordance with the correspondence, a range of first brightness that causes the brightness of the first area not to reach an upper or lower saturation point based on the detected brightness of the first area and brightness of the third area, estimates, for a fourth area of the second image that is an area associated with the second area in accordance with the correspondence, a range of second brightness that causes the brightness of the second area not to reach an upper or lower saturation point based on the detected brightness of the second area and brightness of the fourth area, and adjusts brightness of a fifth area corresponding to the third area in the projection image so as to fall within the range of the first brightness and adjusts brightness of a sixth area corresponding to the fourth area in the projection image so as to fall within the range of the second brightness.

A non-transitory computer-readable storage medium according to another aspect of the present disclosure for solving the problem described above stores a program that causes a computer to identify correspondence between a projector coordinate system indicating a position in a first image and a camera coordinate system indicating a position in a first captured image based on the first image and the first captured image, the first captured image being produced by causing a first camera to capture an image of a projection receiving object with the first image projected thereon from a projector that projects a projection image onto the projection receiving object, detect brightness of a first area and brightness of a second area of a second captured image produced by causing the first camera to capture an image of the projection receiving object with a second image projected thereon from the projector, estimate, for a third area of the second image that is an area associated with the first area in accordance with the correspondence, a range of first brightness that causes the brightness of the first area not to reach an upper or lower saturation point based on the detected brightness of the first area and brightness of the third area, estimate, for a fourth area of the second image that is an area associated with the second area in accordance with the correspondence, a range of second brightness that causes the brightness of the second area not to reach an upper or lower saturation point based on the detected brightness of the second area and brightness of the fourth area, and adjust brightness of a fifth area corresponding to the third area in the projection image so as to fall within the range of the first brightness and adjusts brightness of a sixth area corresponding to the fourth area in the projection image so as to fall within the range of the second brightness.

DESCRIPTION OF EXEMPLARY EMBODIMENTS

An embodiment of the present disclosure will be described below with reference to the drawings. A variety of technically preferable restrictions are imposed on the embodiment described below. The embodiment of the present disclosure is, however, not limited to the form described below.

1. Embodiment

Figure 1:
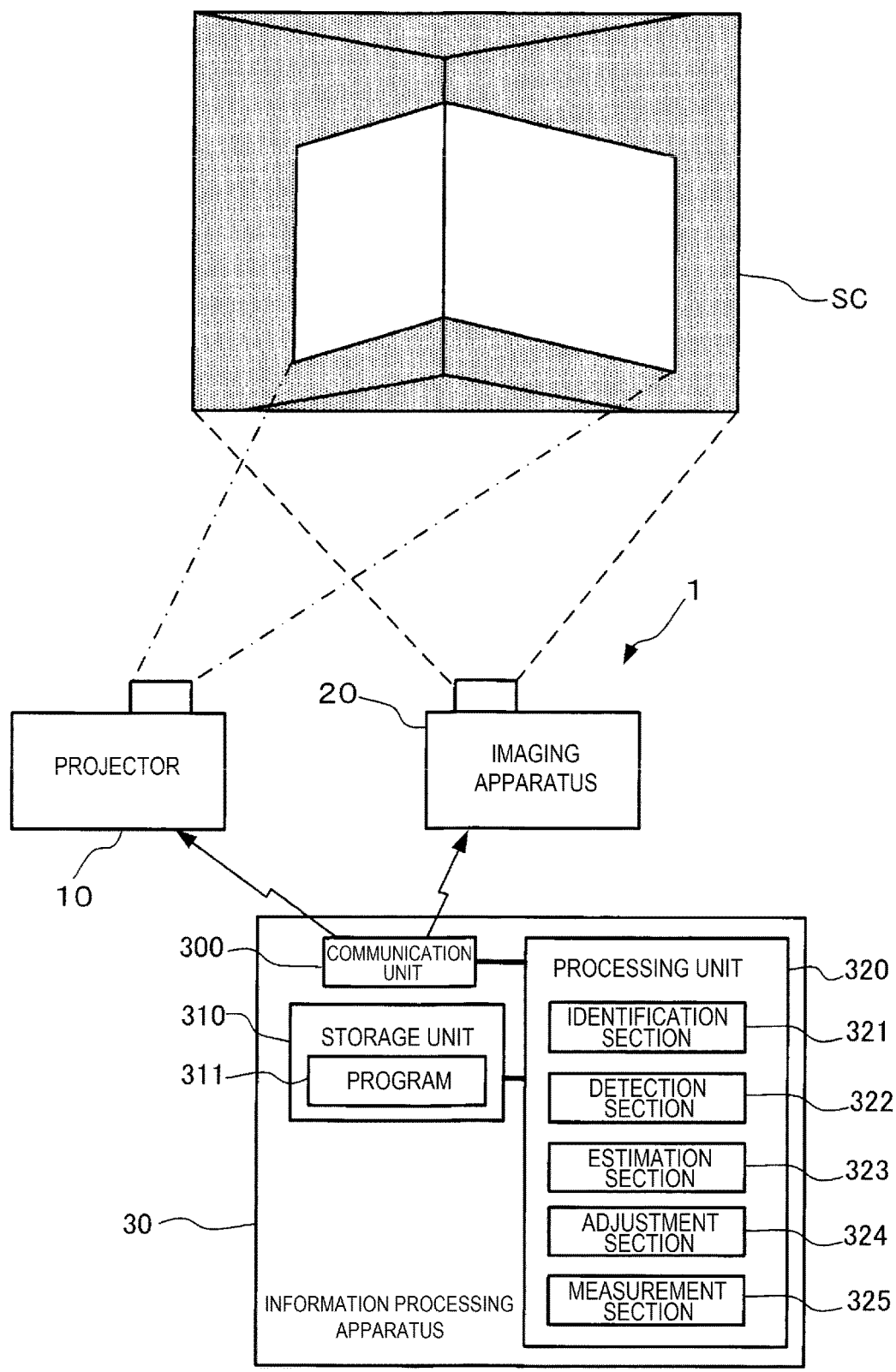
FIG. 1 is a block diagram showing an example of the configuration of a measurement system including an information processing apparatus according to an embodiment of the present disclosure.

FIG. 1 shows an example of the configuration of a measurement system 1 according to the embodiment of the present disclosure. The measurement system 1 includes a projector 10, an imaging apparatus 20, and an information processing apparatus 30, as shown in FIG. 1. The measurement system 1 shown in FIG. 1 is a system for measuring the three-dimensional shape of an object. In the measurement system 1, a pattern image for the three-dimensional measurement is projected from the projector 10 onto a measurement target object SC, which is a target of the three-dimensional shape measurement, under the control of the information processing apparatus 30. In the measurement system 1, the imaging apparatus 20 captures an image of the measurement target object SC with the pattern image projected thereon. In the measurement system 1, the information processing apparatus 30 performs computation of measuring the three-dimensional shape of the measurement target object SC based on the pattern image and the image captured by the imaging apparatus 20. The measurement system is an example of the projection system in the present disclosure. The measurement target object SC is an example of the projection receiving object in the present disclosure.

The projector 10 includes, for example, a liquid crystal light valve for projecting an image, a projection lens, a liquid crystal driver, and an ultrahigh-pressure mercury lamp as a light source. The light source in the projector 10 may be a metal halide lamp. The projector 10 is communicably coupled to the information processing apparatus 30, for example, via a cable. The projector 10 acquires image data representing the pattern image from the information processing apparatus 30 through the communication via the cable. In the present embodiment, the communication between the projector 10 and the information processing apparatus 30 is, for example, wired communication compliant with Ethernet, USB (universal serial bus), or any other standard. Ethernet is a registered trademark. The communication between the projector 10 and the information processing apparatus 30 may instead be wireless communication compliant with Wi-Fi or any other standard. The projector 10 projects the pattern image indicated by the acquired image data onto the measurement target object SC.

The imaging apparatus 20 is, for example, a camera including an imaging device that converts light focused thereon into an electrical signal, such as a CCD (charge coupled device) and a CMOS (complementary metal oxide semiconductor) device. It is assumed in the following description that the imaging apparatus 20 captures still images for simplification of the description. The imaging apparatus 20 may capture motion images in place of still images. The imaging apparatus 20 captures an image of the measurement target object SC. The imaging apparatus 20 is communicably coupled to the information processing apparatus 30, for example, via a cable, as the projector 10 is. The imaging apparatus 20 transmits image data representing the captured image to the information processing apparatus 30. In the present embodiment, the communication between the imaging apparatus 20 and the information processing apparatus 30 is, for example, wired communication compliant with Ethernet, USB, or any other standard and may instead be wireless communication compliant with Wi-Fi or any other standard. The imaging apparatus 20 is an example of the first camera in the present disclosure.

In the present embodiment, the projector 10 and the imaging apparatus 20 are disposed in fixed positions different from each other. The positions where the projector 10 and the imaging apparatus 20 are arranged have been so adjusted in advance that the arrangement is suitable for the three-dimensional measurement. In the projector 10, lens-related distortion produced by the projection lens has been corrected. Similarly, in the imaging apparatus 20, lens-related distortion produced by an imaging lens has been corrected. The amount of exposure that the imaging apparatus 20 receives and the gain that the imaging apparatus 20 provides have been adjusted so as to be suitable for the three-dimensional measurement. In the measurement system 1 according to the present embodiment, the three-dimensional shape of the measurement target object SC is measured by using the phase shift method. In a more detailed description of the measurement system 1, the projector 10 first projects an image of a fringe pattern having sinusoidally changing brightness onto the measurement target object SC under the control of the information processing apparatus 30. The information processing apparatus 30 shifts the phase of the fringe pattern projected on the measurement target object SC by a predetermined amount of phase shift. The phase shift is repeated multiple times until the phase of the fringe pattern is shifted by the amount corresponding to one cycle. The number of times the phase of the fringe pattern is shifted is typically 3 or 4, and the number of times is 4 in the present embodiment. That is, the amount of phase shift in the present embodiment is $\pi/2$ [rad]. The character $\pi$ represents the ratio of the circumference of a circle to the diameter. Whenever shifting the phase of the fringe pattern, the information processing apparatus 30 causes the imaging apparatus 20 to capture an image of the measurement target object SC with the image of the fringe pattern projected thereon and acquires image data representing the captured image from the imaging apparatus 20. Therefore, in the present embodiment, the information processing apparatus 30 acquires four image data corresponding on a one-to-one basis to four fringe patterns having phases shifted by 0, $\pi/2$, $\pi$, and $3\pi/2$.

Brightness values $I0(x, y)$, $I1(x, y)$, $I2(x, y)$, and $I3(x, y)$ of the pixel located at the coordinate $(x, y)$ in each of the four images produced by capturing images of the measurement target object SC on which the fringe patterns having phases shifted by 0, $\pi/2$, $\pi$, and $3\pi/2$ have been sequentially projected are expressed by Expressions (1), (2), (3), and (4) below, respectively. In the expressions, A represents the amplitude of the brightness of the fringe pattern. G represents the brightness of ambient light, such as the external light. R represents the reflectance of the measurement target object SC. $\phi$ represents the phase of the sinusoidally changing brightness at the coordinate $(x, y)$.

$$I0(x, y) = \{A \cdot \cos(\phi) + G\} \times R \quad (1)$$

$$I1(x, y) = \left\{A \cdot \cos\left(\phi - \frac{\pi}{2}\right) + G\right\} \times R \quad (2)$$

$$I2(x, y) = \{A \cdot \cos(\phi - \pi) + G\} \times R \quad (3)$$

$$I3(x, y) = \left\{A \cdot \cos\left(\phi - \frac{2\pi}{3}\right) + G\right\} \times R \quad (4)$$

Even though the absolute brightness in the same position on the four images described above changes in accordance with the shape or the color of the surface, in that position, of the measurement target object SC, the difference in brightness is always a value according to the difference in the phase of the fringe pattern. For example, the difference between I0(x, y) and I1(x, y) is a value according to π/2. Therefore, the phase φ(x, y) at the coordinate (x, y) in an image of the measurement target object SC is calculated by causing the information processing apparatus 30 to perform the computation of deleting A, G, and R from Expressions (1), (2), (3), and (4), specifically, the computation expressed by Expression (5) below.

$$\phi(x,y) = \arctan\{I3(x,y) - I1(x,y)\} / \{I0(x,y) - I2(x,y)\} \quad (5)$$

The phase φ(x, y) calculated in accordance with Expression (5) is a value calculated for each cycle of each of the fringe patterns and ranges from −π to π. The phase φ(x, y) calculated in accordance with Expression (5) indicates a position in the fringe pattern having the length of one cycle and is therefore also called a relative phase. When a fringe pattern having the length of a plurality of cycles is projected onto the measurement target object SC, and the pixel located at the coordinate (x, y) corresponds to the n-th fringe, the phase uniquely indicating the coordinate (x, y) is expressed as φ(x, y)+2nπ. The parameter n is an integer greater than or equal to zero and is called a fringe order. The fringe order indicates the number of the cycle of a fringe pattern having a length of a plurality of cycles, the number counted from the fringe at one end of the fringe pattern toward the fringe at the other end of the fringe pattern. The phase in consideration of the fringe order is also called an absolute phase. To measure the three-dimensional shape of the measurement target object SC by using the phase shift method, it is necessary to calculate the absolute phase at the coordinates (x, y). To calculate the absolute phase at the coordinate (x, y), it is necessary to estimate the fringe order at the coordinate (x, y). A method for estimating the fringe order may, for example, be a method including changing the amplitude of the fringe pattern for each cycle, writing the amplitude for each cycle, for example, in a table, and estimating the fringe order based on the amplitude A calculated from. Expressions (1), (2), (3), and (4) and the table described above, as disclosed in JP-A-2009-115612. The information processing apparatus 30 measures the three-dimensional shape of the measurement target object SC by calculating the height at the coordinates (x, y) based on the absolute phase at the coordinates (x, y) by using the principle of triangulation.

The outline of the three-dimensional shape measurement based on the phase shift method has been described above. In the captured image of the measurement target object SC with the image of the fringe pattern projected thereon, the brightness of the fringe pattern varies in some cases from area to area even in the same captured image due, for example, to the reflection characteristics of the measurement target object SC or the surrounding external light. The reflection characteristics of the measurement target object SC are determined in accordance, for example, with the shape or the color of the surface of the measurement target object SC. The accuracy of the measurement of the three-dimensional shape of the measurement target object SC may decrease in an area of the captured image of the fringe pattern that is an area where the brightness does not fall within a proper brightness range, for example, the brightness of the fringe pattern is too high or too low. The information processing apparatus 30 in the present embodiment is configured to avoid a decrease in the accuracy of the measurement of the three-dimensional shape of the measurement target object SC, for example, even under the influence of the reflection characteristics of the measurement target object SC or the surrounding external light. The following description will be primarily made of the information processing apparatus 30.

The information processing apparatus 30 is, for example, a personal computer. The information processing apparatus 30 includes a communication unit 300, a storage unit 310, and a processing unit 320, as shown in FIG. 1. The projector 10 is coupled to the communication unit 300 via a cable. The imaging apparatus 20 is coupled to the communication unit 300 via a cable. The communication unit 300 receives image data transmitted from the imaging apparatus 20. The communication unit 300 transmits the image data representing a pattern image to be projected onto the measurement target object SC to the projector 10 under the control of the processing unit 320.

The storage unit 310 is a recording medium readable by the processing unit 320. The storage unit 310 includes, for example, a nonvolatile memory and a volatile memory. The nonvolatile memory is, for example, a ROM (read only memory), an EPROM (erasable programmable read only memory), or an EEPROM (electrically erasable programmable read only memory). The volatile memory is, for example, a RAM (random access memory).

The nonvolatile memory of the storage unit 310 stores a program 311 executed by the processing unit 320. The volatile memory of the storage unit 310 is used by the processing unit 320 as a work area when the processing unit 320 executes the program 311. The program 311 can also be referred to as an "application program," "application software," or an "app." The program 311 is acquired, for example, from a server or any other apparatus that is not shown via the communication unit 300 and then stored in the storage unit 310.

The processing unit 320 includes, for example, a processor, such as a CPU (central processing unit), that is, a computer. The processing unit 320 may be formed of a single computer or a plurality of computers. Triggered by operation performed on an input apparatus that is not shown and instructing start of execution of the program 311, the processing unit 320 reads the program 311 from the nonvolatile memory and transfers the read program 311 to the volatile memory. The processing unit 320 executes the read program 311. The processing unit 320 operating in accordance with the program 311 functions as an identification section 321, a detection section 322, an estimation section 323, an adjustment section 324, and a measurement section 325 shown in FIG. 1. The identification section 321, the detection section 322, the estimation section 323, the adjustment section 324, and the measurement section 325 shown in FIG. 1 are software modules achieved by operating the processing unit 320 in accordance with the program 311. The functions performed by the identification section 321, the detection section 322, the estimation section 323, the adjustment section 324, and the measurement section 325 will be described below.

The identification section 321 identifies the correspondence between a projector coordinate system and a camera coordinate system. The projector coordinate system is a coordinate system that indicates a position in an image projected by the projector 10. A specific example of the projector coordinate system is a two-dimensional coordinate system having an origin located at the upper left corner of an image projected by the projector 10. The camera coordinate system is a coordinate system that indicates a position in an image captured by the imaging apparatus 20. A specific example of the camera coordinate system is a two-dimensional coordinate system having an origin located at the upper left corner of an image captured by the imaging apparatus 20.

Figure 2:
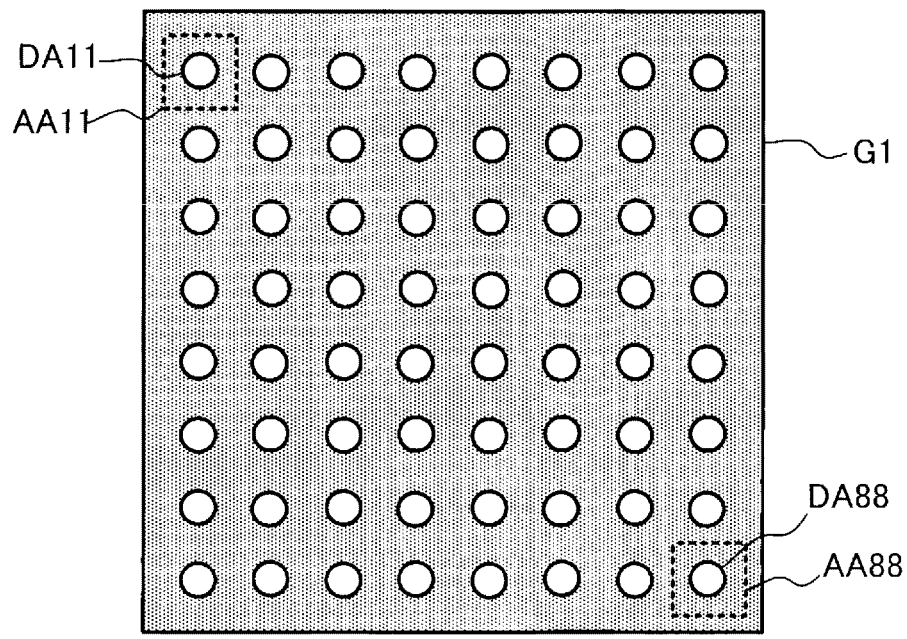
FIG. 2 shows an example of an image of a dot pattern to be projected from a projector onto a measurement target object.

In the present embodiment, the identification section 321 provides the projector 10 with image data representing an image G1 of an 8×8 dot pattern shown in FIG. 2 to cause the projector 10 to project the image G1 of the dot pattern onto the measurement target object SC. In the image G1, the area filled with black is the area where no light is projected from the projector 10, and the white blank areas are formed of dots where light is projected from the projector 10. The image G1 of the dot pattern is an example of a first image in the present disclosure.

The identification section 321 causes the imaging apparatus 20 to capture an image of the measurement target object SC with the image G1 of the dot pattern projected thereon. The image, captured by the imaging apparatus 20, of the measurement target object SC with the image G1 of the dot pattern projected thereon is an example of the first captured image in the present disclosure. The identification section 321 identifies the correspondence between the projector coordinate system and the camera coordinate system based on the captured image of the measurement target object SC with the image G1 of the dot pattern projected thereon and the image G1 of the dot pattern.

Figure 3:
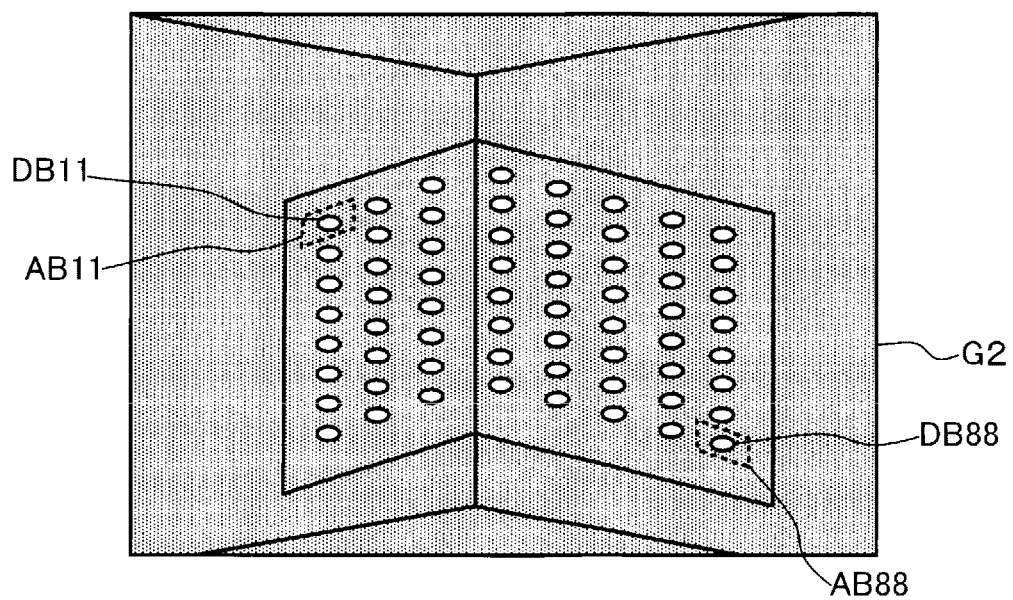
FIG. 3 shows an example of a captured image produced by causing an imaging apparatus to capture an image of the measurement target object with the image of the dot pattern projected thereon.

It is assumed that an image G2 shown in FIG. 3 is produced as the captured image of the measurement target object SC with the image G1 shown in FIG. 2 projected thereon. The identification section 321 identifies the correspondence between the projector coordinate system and the camera coordinate system by associating, for each of the 8×8 dots in the image G1 shown in FIG. 2, the position of the dot in the projector coordinate system with the position, in the camera coordinate system, of the dot corresponding to the dot in the image G2 shown in FIG. 3. For example, a dot DA11 located in the first row and the first column in the image G1 is associated with a dot DB11 in the image G2. Furthermore, a dot DA88 located in the eighth row and the eighth column in the image G1 is associated with a dot DB88 in the image G2. The dot DA11 is an example of the first feature point in the present disclosure. The dot DA88 is an example of the second feature point in the present disclosure. The dot DB11 is an example of the third feature point in the present disclosure. The dot DB88 is an example of the fourth feature point in the present disclosure.

In an image projected from the projector 10 to the measurement target object SC, 8×8 areas can be set around the centers of the 8×8 dots shown in FIG. 2 so as not to overlap with each other. In FIG. 2, among the 8×8 areas, an area AA11 around the dot DA11 and an area AA88 around the dot DA88 are drawn with dotted lines. Similarly, in an image captured by the imaging apparatus 20, 8×8 areas can be set around the centers of the 8×8 dots shown in FIG. 3 so as not to overlap with each other. In FIG. 3, among the 8×8 areas, an area AB11 around the dot DB11 and an area AB88 around the dot DB88 are drawn with dotted lines. The 8×8 areas set in the projection image are associated on a one-to-one basis with the 8×8 areas set in the captured image in accordance with the correspondence identified by the identification section 321. Specifically, the area AB11 is associated with the area AA11. The area AB88 is associated with the area AA88. The area AB11 is an example of the first area in the present disclosure. The area AB88 is an example of the second area in the present disclosure. The area AA11 is an example of the third area in the present disclosure. The area AA88 is an example of the fourth area in the present disclosure.

The detection section 322 provides the projector 10 with image data representing a monochromatic image to cause the projector 10 to project the monochromatic image onto the measurement target object SC. The detection section 322 then causes the imaging apparatus 20 to capture an image of the measurement target object SC with the monochromatic image projected thereon. The monochromatic image is an example of the second image in the present disclosure. The captured image of the measurement target object SC with the monochromatic image projected thereon is an example of the second captured image in the present disclosure. In the present embodiment, the detection section 322 causes the projector 10 to project a plurality of monochromatic images that have uniform brightness in the respective images but differ in brightness from one another onto the measurement target object SC. In a more detailed description, the detection section 322 causes the projector 10 to project white images that have uniform brightness in the respective images but have different brightness values of 20%, 40%, 60%, 80%, and 100% onto the measurement target object SC. The detection section 322 causes the imaging apparatus 20 to capture an image of the measurement target object SC with each of the plurality of monochromatic images projected thereon. The detection section 322 then detects the brightness in each of the 8×8 areas AB11 to AB88 in the captured image for each of the monochromatic images.

The estimation section 323 estimates, based on the result of the detection performed by the detection section 322, a brightness distribution map showing the distribution of the brightness of a projection image that does not cause the brightness of the captured image to reach an upper or lower saturation point in any of the areas AB11 to AB88. In more detail, the estimation section 323 estimates, based on the brightness detected by the detection section 322 for each of the monochromatic images, a brightness range that does not cause the brightness of the area associated by the correspondence identified by the identification section 321 with each of the 8×8 areas AA11 to AA88 to reach an upper or lower saturation point.

For example, consider a case where the brightness value of the area AB11 reaches the upper saturation point for the 100% white image and reaches the lower saturation point for the 40% white image. The situation in which the brightness value reaches an upper saturation point means that the brightness value is an upper limit, and the situation in which the brightness value reaches a lower saturation point means that the brightness value is a lower limit. In this case, the estimation section 323 estimates that the range of the brightness of the area AA11 that does not cause the brightness of the area AB11 to reach the upper or lower saturation point ranges from 60% to 80%. The brightness range estimated for the area AA11 is an example of the first brightness range in the present disclosure. Consider another case where the brightness value of the area AB88 reaches the upper saturation point for the 80% white image and reaches the lower saturation point for the 20% white image. In this case, the estimation section 323 estimates that the range of the brightness of the area AA88 that does not cause the brightness of the area AB88 to reach the upper or lower saturation point ranges from 40% to 60%. The brightness range estimated for the area AA88 is an example of the second brightness range in the present disclosure. In the present embodiment, the estimation section 323 estimates a brightness range that does not cause the brightness of the area associated by the correspondence identified by the identification section 321 with each of the 8×8 areas AA11 to AA88 to reach an upper or lower saturation point, and the distribution of the estimated brightness range forms the brightness distribution map.

The adjustment section 324 carries out the following process by using each of the images of the four fringe patterns that are out of phase from each other by π/2 as an adjustment target image. The adjustment section 324 divides the adjustment target image into 8×8 areas corresponding on a one-to-one basis to the areas AA11 to AA88 described above. The adjustment section 324 then adjusts the amplitude of the sine wave based on the brightness distribution map estimated by the estimation section 323 for each area obtained by dividing the adjustment target image into the 8×8 areas. For example, the adjustment section 324 adjusts the brightness of each pixel that belongs to the area corresponding to the area AA11 so as to fall within the brightness range estimated for the area AA11. The area corresponding to the area AA11 in each of the images of the four fringe patterns is an example of the fifth area in the present disclosure. Similarly, the adjustment section 324 adjusts the brightness of each pixel that belongs to the area corresponding to the area AA88 so as to fall within the brightness range estimated for the area AA88. The area corresponding to the area AA88 in each of the images of the four fringe patterns is an example of the sixth area in the present disclosure.

The measurement section 325 measures the three-dimensional shape of the measurement target object SC by executing the phase shift method using a fringe pattern image having undergone the brightness adjustment on an area basis performed by the adjustment section 324. In a more detailed description, the measurement section 325 causes the projector 10 to project the fringe pattern image having undergone the brightness adjustment on an area basis performed by the adjustment section 324. The measurement section 325 causes the imaging apparatus 20 to capture an image of the measurement target object SC with the pattern image projected thereon. The measurement section 325 then calculates the relative phase φ(x, y) at the coordinates (x, y) by using the computation expressed by Expression (5) described above. The measurement section 325 estimates the fringe order and calculates the absolute phase. The measurement section 325 then measures the three-dimensional shape of the measurement target object SC by calculating the height at the coordinates (x, y) based on the absolute phase at the coordinates (x, y) by using the principle of triangulation.

Figure 4:
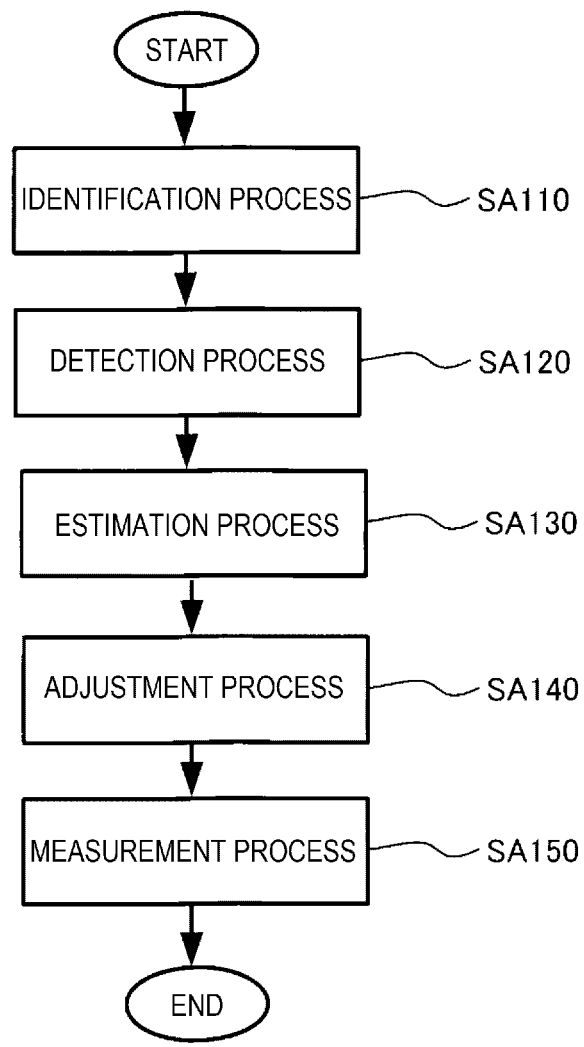
FIG. 4 shows an example of a flowchart showing the procedure of a measurement method executed by a processing unit of the information processing apparatus in accordance with a program.

The processing unit 320 operating in accordance with the program 311 executes the measurement method according to the present disclosure. FIG. 4 is a flowchart showing the procedure of the measurement method according to the present disclosure. The measurement method according to the present disclosure includes an identification process SA110, a detection process SA120, an estimation process SA130, an adjustment process SA140, and a measurement process SA150, as shown in FIG. 4.

In the identification process SA110, the processing unit 320 functions as the identification section 321. In the identification process SA110, the processing unit 320 causes the projector 10 to project the image G1 of the dot pattern shown in FIG. 2 onto the measurement target object SC. The processing unit 320 causes the imaging apparatus 20 to capture an image of the measurement target object SC with the image G1 of the dot pattern projected thereon. The processing unit 320 then identifies the correspondence between the projector coordinate system and the camera coordinate system based on the captured image of the measurement target object SC with the image G1 of the dot pattern projected thereon and the image G1 of the dot pattern.

In the detection process SA120, the processing unit 320 functions as the detection section 322. In the detection process SA120, the processing unit 320 causes the projector 10 to project each of the plurality of monochromatic images having brightness values different from one another onto the measurement target object SC by providing the projector 10 with image data representing the monochromatic image. The processing unit 320 causes the imaging apparatus 20 to capture an image of the measurement target object SC with the monochromatic image projected thereon on a monochromatic image basis. The processing unit 320 then detects the brightness value in each of the plurality of areas set in the captured image on a monochromatic image basis.

In the estimation process SA130, the processing unit 320 functions as the estimation section 323. In the estimation process SA130, the processing unit 320 estimates the brightness distribution map, which shows the distribution of brightness values of the projection image that do not cause the brightness values in any area of the captured image to reach the upper or lower saturation point, based on the result of the detection performed by the detection section 322.

In the adjustment process SA140, the processing unit 320 functions as the adjustment section 324. In the adjustment process SA140, the processing unit 320 uses each of the images of the four fringe patterns that are out of phase from each other by π/2 as the adjustment target image and adjusts the amplitude of the sine wave in such a way that the brightness falls within the range indicated by the brightness distribution map estimated in the estimation process SA130 for each area of the adjustment target image.

In the measurement process SA150, the processing unit 320 functions as the measurement section 325. In the measurement process SA150, the processing unit 320 measures the three-dimensional shape of the measurement target object SC by executing the phase shift method using a fringe pattern image having undergone the brightness adjustment on an area basis in the adjustment process SA140.

The effects of the present embodiment will be described below with reference to a case where only the area AB11 in the captured image of the measurement target object SC with a fringe pattern image projected thereon has higher brightness than the other areas due, for example, to the reflection characteristics of the area or the external light. In the phase shift method in related art based on a uniform brightness distribution, a fringe pattern image with the overall brightness so suppressed that the brightness of the area AB11 does not reach the upper or lower saturation point is projected on the measurement target object SC, so that the signal value of the captured image decreases in the areas other than the area AB11. Since the S/N ratio decreases in the areas other than the area AB11, the accuracy of the calculation of the relative phase φ(x, y) decreases, and the accuracy of the measurement of the three-dimensional shape of the measurement target object SC decreases accordingly.

On the other hand, in the measurement method according to the present embodiment, since a fringe pattern image in which only the brightness of the area AA11, which is associated with the area AB11 based on the correspondence between the projector coordinate system and the camera coordinate system, is suppressed, is projected onto the measurement target object SC, a high signal value can be provided substantially across the entire captured image of the measurement target object SC, whereby a decrease in the accuracy of the calculation of the relative phase ϕ(x, y) can be avoided. The present embodiment can therefore prevent the accuracy of the measurement of the three-dimensional shape of the measurement target object SC from decreasing due, for example, to the reflection characteristics or the external light.

As described above, according to the present embodiment, a fringe pattern image having undergone the brightness adjustment in accordance with the reflection characteristics of the measurement target object SC, the surrounding external light, or any other factor is projected. Therefore, in a captured image of the measurement target object SC with the fringe pattern image projected thereon, there is no occurrence of whitened defects caused by brightness values having reached the upper saturation point or blackened defects caused by brightness values having reached the lower saturation point. Since whitened or blackened defects do not occur in the captured image of the measurement target object SC with the fringe pattern image projected thereon, the accuracy of the measurement of the three-dimensional shape of the measurement target object SC does not decrease. The measurement system 1 according to the present embodiment can thus avoid a decrease in the accuracy of the measurement of the three-dimensional shape of the measurement target object SC due, for example, to the reflection characteristics of the measurement target object SC or the surrounding external light.

In the present embodiment, the three-dimensional shape of the measurement target object SC is measured based on the principle of triangulation by using a fringe pattern image having undergone the brightness adjustment on an area basis and the captured image of the measurement target object SC with the fringe pattern image projected thereon. The three-dimensional shape of the measurement target object SC may instead be measured by using a captured image produced by causing the imaging apparatus 20, which is the first camera, to capture an image of the measurement target object SC on which the fringe pattern image having undergone the brightness adjustment on an area basis has been projected and a captured image produced by causing a second camera disposed in a position different from the position of the first camera to capture an image of the measurement target object SC.

Figure 5:
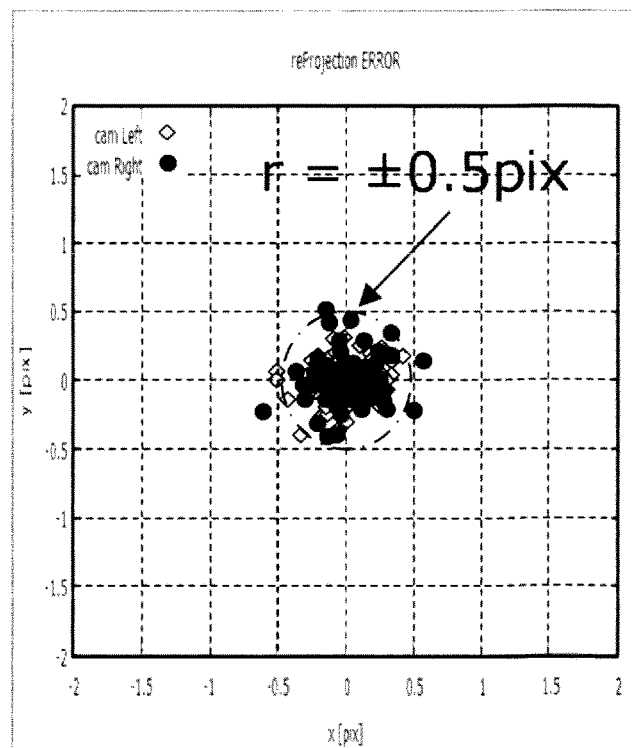
FIG. 5 describes an effect of the present disclosure.
Figure 6:
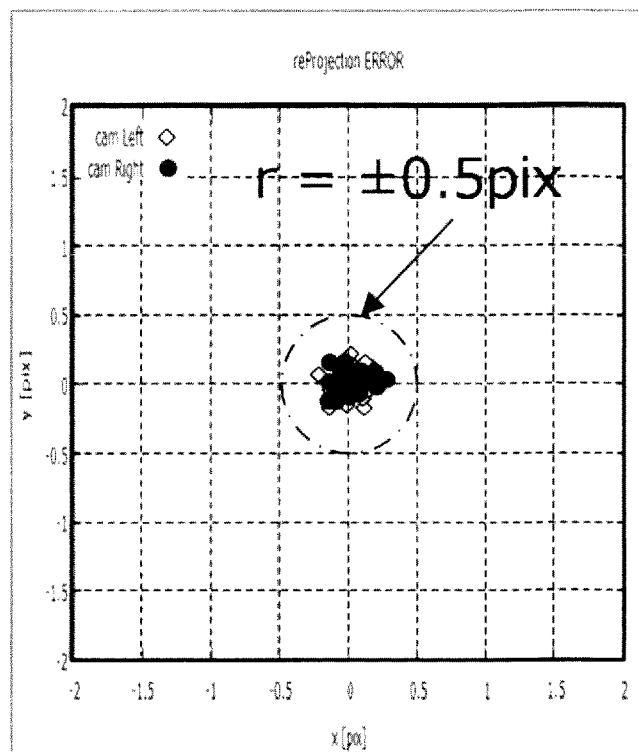
FIG. 6 describes the effect of the present disclosure.

In the three-dimensional measurement based on the phase shift method using the first and second cameras, the three-dimensional coordinates are calculated from a parallax value produced from the coordinates of a feature point in an image captured by the first camera and the coordinates of the feature point in an image captured by the second camera. Therefore, when variation in the coordinates of the feature point between the image captured by the first camera and the image captured by the second camera is small, three-dimensional coordinates having smaller variance can be calculated, that is, the accuracy of the three-dimensional measurement can be improved. FIG. 5 shows an example of the variance of the coordinates of the feature point that are calculated by the phase shift method in related art based on a uniform brightness distribution. On the other hand, FIG. 6 shows an example of the variance of the coordinates of the feature point that are calculated by using a fringe pattern image having undergone the brightness adjustment on an area basis. Comparison between FIGS. 5 and 6 clearly shows that the variation in the coordinates of the feature point decreases by using a fringe pattern image having undergone the brightness adjustment on an area basis, as compared with the phase shift in related art based on a uniform brightness distribution. RMSE in FIG. 5 is 0.260535 pixels, and RMSE in FIG. 6 is 0.112996 pixels. RMSE is the abbreviation for a root mean square error. As described above, also in the three-dimensional measurement based on the phase shift method using the first and second cameras, the use of a fringe pattern image having undergone the brightness adjustment on an area basis avoids a decrease in the measurement accuracy caused, for example, by reflection characteristics of the measurement target object SC or the surrounding external light.

2. Variations

The embodiment described above may be changed as follows.

(1) In the embodiment described above, an image of a dot pattern is used as a pattern image for identifying the correspondence between the projector coordinate system and the camera coordinate system. It is, however, noted that an image of a gray code pattern or a binary code pattern may be used in place of an image of a dot pattern. In the embodiment described above, the three-dimensional shape of the measurement target object SC is measured by using an image of a fringe pattern having brightness that sinusoidally changes in the image. It is, however, noted that an image of a gray code pattern or a binary code pattern may be used in place of an image of a fringe pattern. In an image of a gray code pattern or a binary code pattern, the brightness in the image periodically changes, as in an image of a fringe pattern. When an image of a gray code pattern or a binary code pattern is used, the pixels in the white portion may be adjusted to a darker color, such as gray, in an area that forms a bright area in a captured image.

(2) In the embodiment described above, the brightness distribution map is created by using four monochromatic images having brightness values different from one another. Instead, the brightness distribution map may be created by using two or three monochromatic images having brightness values different from one another or by using five or more monochromatic images having brightness values different from one another. In an aspect in which two monochromatic images having brightness values different from each other are used, one of the monochromatic images is an example of the first monochromatic image in the present disclosure. In the aspect in which two monochromatic images having brightness values different from each other are used, the other the monochromatic image is an example of the second monochromatic image in the present disclosure. The brightness distribution map may still instead be created by using a single monochromatic image having uniform brightness in the image. Specifically, the brightness distribution map may be created in accordance with the difference between the brightness of each area of a captured image of the measurement target object SC with the monochromatic image projected thereon and a reference value predicted as the brightness in the captured image.

(3) In the embodiment described above, the program 311 has been stored in the storage unit 310. The program 311 may instead be manufactured or distributed as a standalone program. As a specific method for distributing the program 311, it is conceivable to employ an aspect in which the program 311 described above is written onto a computer readable recording medium, such as a flash ROM (read only memory), and the medium is then distributed or an aspect in which the program 311 described above is distributed as a program downloaded via an electric communication line, such as the Internet.

(4) The identification section 321, the detection section 322, the estimation section 323, the adjustment section 324, and the measurement section 325 in the embodiment described above are each a software module, and part or entirety of the detection section 322, the estimation section 323, the adjustment section 324, and the measurement section 325 may be hardware. Examples of the hardware may include a DSP (digital signal processor), an ASIC (application specific integrated circuit), a PLD (programmable logic device), and an FPGA (field programmable gate array). Even when part or entirety of the detection section 322, the estimation section 323, the adjustment section 324, and the measurement section 325 is hardware, the same effects as those provided by the embodiment described above can be provided. The information processing apparatus 30 in the embodiment described above may be a table terminal or a smartphone.

(5) The measurement section 325 in the embodiment described above may be omitted. According to an information processing apparatus including the identification section 321, the detection section 322, the estimation section 323, and the adjustment section 324, occurrence of whitened or blackened defects is avoided in a captured image of the projection receiving object with a projection image projected thereon from the projector 10. The projection system may instead be formed of the combination of the information processing apparatus described above, the projector 10, and the imaging apparatus 20. According to the projection system described above, occurrence of whitened or blackened defects is avoided in a captured image of the projection receiving object with a projection image projected thereon from the projector 10. A projection image adjusting method including the identification process SA110, the detection process SA120, the estimation process SA130, and the adjustment process SA140 may be provided. According to the adjustment method described above, occurrence of whitened or blackened defects is avoided in a captured image of the projection receiving object with a projection image projected thereon from the projector 10.

(6) The adjustment section 324 in the embodiment described above divides an adjustment target image into 8×8 areas corresponding on a one-to-one basis to the areas AA11 to AA88 and adjusts, for each of the areas, the brightness of each pixel in the area based on the brightness distribution map. Instead, to avoid discontinuous changes in the brightness of two pixels adjacent to each other and sandwiching the boundary between the areas to which the two pixels belong, filtering using, for example, a moving average filter may be performed on an adjustment target image having undergone the adjustment of the brightness of the pixels based on the brightness distribution map.

3. Aspect Derived from at Least One of Embodiment and Variations

The present disclosure is not limited to the embodiment or variations described above and can be achieved in a variety of aspects to the extent that they do not depart from the substance of the present disclosure. For example, the present disclosure can be achieved by the aspects below. The technical features in the embodiment described above that correspond to the technical features in the aspects described below can be replaced by or combined with other technical features as appropriate to solve part or entirety of the problem in the present disclosure or achieve part or entirety of the effects of the present disclosure. Furthermore, when any of the technical features has not been described as an essential feature in the present specification, the technical feature can be deleted as appropriate.

To solve the problem described above, the projection image adjusting method according to the present disclosure is an adjustment method for adjusting a projection image projected from the projector 10 onto a projection receiving object and includes the identification process SA110, the detection process SA120, the estimation process SA130, and the adjustment process SA140. The identification process SA110 identifies the correspondence between a projector coordinate system and a camera coordinate system based on a first image projected from the projector 10 onto the projection receiving object and a first captured image produced by causing the imaging apparatus 20 to capture an image of the projection receiving object with the first image projected thereon. The projector coordinate system is a coordinate system that indicates a position in the first image. The camera coordinate system is a coordinate system that indicates a position in the first captured image. The detection process SA120 detects the brightness of a first area of a second captured image produced by causing the imaging apparatus 20 to capture an image of the projection receiving object with a second image projected thereon from the projector 10 and the brightness of the second area of the second captured image. An example of the second image may be a monochromatic image. The estimation process SA130 estimates, for a third area of the second image that is an area associated with the first area in accordance with the correspondence described above, the range of first brightness that causes the brightness of the first area not to reach an upper or lower saturation point based on the detected brightness of the first area and the brightness of the third area. The estimation process SA130 further estimates, for a fourth area of the second image that is an area associated with the second area in accordance with the correspondence described above, the range of second brightness that causes the brightness of the second area not to reach an upper or lower saturation point based on the detected brightness of the second area and the brightness of the fourth area. The adjustment process SA140 adjusts the brightness of a fifth area corresponding to the third area in the projection image so as to fall within the range of the first brightness. The adjustment process SA140 further adjusts the brightness of a sixth area corresponding to the fourth area in the projection image so as to fall within the range of the second brightness. The adjustment method according to the present aspect avoids occurrence of whitened or blackened defects in a captured image that occur when a first camera captures an image of the projection receiving object with the projection image projected thereon.

In the adjustment method according to a more preferable aspect, the range of the first brightness and the range of the second brightness may be estimated by causing the projector 10 to sequentially project as the second image a first monochromatic image and a second monochromatic image each having brightness that is uniform in the image but different from each other. Specifically, the estimation process SA130 estimates the range of the first brightness based on the brightness of the first area detected when the first monochromatic image is projected, the brightness of the first area detected when the second monochromatic image is projected, and the brightness of the third area. Similarly, the estimation process SA130 estimates the range of the second brightness based on the brightness of the second area detected when the first monochromatic image is projected, the brightness of the second area detected when the second monochromatic image is projected, and the brightness of the fourth area.

In the adjustment method according to another more preferable aspect, the first image may be an image containing a first feature point and a second feature point, specifically, an image of a dot pattern. The identification process SA110 in the adjustment method of the present aspect identifies the correspondence between the projector coordinate system and the camera coordinate system based on the position of the first feature point in the first image, the position of a third feature point corresponding to the first feature point in the first captured image, the position of the second feature point in the first image, and the position of a fourth feature point corresponding to the second feature point in the first captured image.

In the adjustment method according to another preferable aspect, the projection image to be projected from the projector 10 onto the projection receiving object may be an image having periodically changing brightness in the image, specifically, an image of a fringe pattern. According to the present aspect, occurrence of whitened or blackened defects is avoided in the fifth area of the captured image of the projection receiving object on which the projection image having periodically changing brightness in the image has been projected. Similarly, the occurrence of the whitened or blackened defects in the sixth area are also avoided.

An aspect of a measurement method according to the present disclosure is a measurement method for measuring the three-dimensional shape of a projection receiving object based on a captured image produced by causing the projector 10 to project a projection image having periodically changing brightness in the image onto a projection receiving object and by causing a first camera to capture an image of the projection receiving object with the projection image projected thereon and a captured image produced by causing a second camera different from the first camera to capture an image of the projection receiving object with the projection image projected thereon. The measurement method includes the identification process SA110, the detection process SA120, the estimation process SA130, and the adjustment process SA140 described above and adjusts the brightness of the projection image projected from the projector 10 onto the projection receiving object in the adjustment process SA140. The adjustment method according to the present aspect avoids a decrease in the accuracy of the measurement of the three-dimensional shape of the projection receiving object due, for example, to the reflection characteristics of the projection receiving object or the surrounding external light.

Another aspect of the measurement method according to the present disclosure is a measurement method for measuring the three-dimensional shape of a projection receiving object based on a projection image having periodically changing brightness in the image and a captured image produced by causing the projector 10 to project the projection image onto a projection receiving object and by causing a first camera to capture an image of the projection receiving object with the projection image projected thereon. The measurement method includes the identification process SA110, the detection process SA120, the estimation process SA130, and the adjustment process SA140 described above and adjusts the brightness of the projection image projected from the projector 10 onto the projection receiving object in the adjustment process SA140. The adjustment method according to the present aspect also avoids a decrease in the accuracy of the measurement of the three-dimensional shape of the projection receiving object due, for example, to the reflection characteristics of the projection receiving object or the surrounding external light.

To solve the problem described above, an aspect of a projection system according to the present disclosure includes the projector 10, the imaging apparatus 20, and the information processing apparatus 30. The projector 10 projects a projection image onto a projection receiving object. The imaging apparatus 20 captures an image of the projection receiving object. The imaging apparatus 20 is an example of the first camera in the present disclosure. The information processing apparatus 30 includes the processing unit 320, which carries out the identification process SA110, the detection process SA120, the estimation process SA130, and the adjustment process SA140 described above. According to the present aspect, occurrence of whitened or blackened defects is avoided in the fifth area of a captured image produced by causing the imaging apparatus 20 to capture an image of the projection receiving object with the projection image projected thereon. Similarly, the occurrence of the whitened or blackened defects in the sixth area are also avoided.

To solve the problem described above, an aspect of an information processing apparatus according to the present disclosure includes the identification section 321, the detection section 322, the estimation section 323, and the adjustment section 324. The identification section 321 carries out the identification process SA110. The detection section 322 carries out the detection process SA120. The estimation section 323 carries out the estimation process SA130. The adjustment section 324 carries out the adjustment process SA140. According to the present aspect, occurrence of whitened or blackened defects is avoided in the fifth area of a captured image produced by causing the imaging apparatus 20 to capture an image of the projection receiving object with the projection image projected thereon. Similarly, the occurrence of the whitened or blackened defects in the sixth area are also avoided.

To solve the problem described above, an aspect of a program according to the present disclosure causes a computer to carry out the identification process SA110, the detection process SA120, the estimation process SA130, and the adjustment process SA140. According to the present aspect, occurrence of whitened or blackened defects is avoided in the fifth area of a captured image produced by causing the imaging apparatus 20 to capture an image of the projection receiving object with the projection image projected thereon. Similarly, the occurrence of the whitened or blackened defects in the sixth area are also avoided.

What is claimed is:

1. An adjustment method comprising:
identifying correspondence between a projector coordinate system indicating a position in a first image and a camera coordinate system indicating a position in a first captured image based on the first image and the first captured image, the first image being projected from a projector onto a projection receiving object and the first captured image being produced by causing a first camera to capture an image of the projection receiving object with the first image projected thereon;

detecting brightness of a first area of a second captured image and brightness of a second area of the second captured image produced by causing the first camera to capture an image of the projection receiving object with a second image projected thereon from the projector;

estimating, for a third area of the second image that is an area associated with the first area in accordance with the correspondence, a range of first brightness that causes the brightness of the first area not to reach an upper and lower saturation point based on the detected brightness of the first area and brightness of the third area;

estimating, for a fourth area of the second image that is an area associated with the second area in accordance with the correspondence, a range of second brightness that causes the brightness of the second area not to reach an upper and lower saturation point based on the detected brightness of the second area and brightness of the fourth area; and adjusting brightness of a fifth area corresponding to the third area in a projection image projected from the projector so as to fall within the range of the first brightness and adjusting brightness of a sixth area corresponding to the fourth area in the projection image so as to fall within the range of the second brightness.

2. The adjustment method according to claim 1, wherein the second image is a monochromatic image.

3. The adjustment method according to claim 2, further comprising:

causing the projector to sequentially project as the second image a first monochromatic image and a second monochromatic image, brightness of the first monochromatic image is uniform in the image, brightness of the second monochromatic image is uniform in the image, and the brightness of the first monochromatic image and the brightness of the second monochromatic image are different;

estimating the range of the first brightness based on the brightness of the first area and the brightness of the third area, the first area detected when the first monochromatic image is projected, the brightness of the first area detected when the second monochromatic image is projected; and estimating the range of the second brightness based on the brightness of the second area detected when the first monochromatic image is projected, the brightness of the second area detected when the second monochromatic image is projected, and the brightness of the fourth area.

4. The adjustment method according to claim 1, wherein the first image contains a first feature point and a second feature point, and the correspondence is identified based on a position of the first feature point in the first image, a position of a third feature point corresponding to the first feature point in the first captured image, a position of the second feature point in the first image, and a position of a fourth feature point corresponding to the second feature point in the first captured image.

5. The adjustment method according to claim 1, wherein the projection image is an image having periodically changing brightness in the image.

6. A measurement method comprising:

identifying correspondence between a projector coordinate system indicating a position in a first image and a camera coordinate system indicating a position in a first captured image based on the first image and the first captured image, the first image being projected from a projector onto a projection receiving object and the first captured image being produced by causing a first camera to capture an image of the projection receiving object with the first image projected thereon;

detecting brightness of a first area of a second captured image and brightness of a second area of the second captured image produced by causing the first camera to capture an image of the projection receiving object with a second image projected thereon from the projector;

estimating, for a third area of the second image that is an area associated with the first area in accordance with the correspondence, a range of first brightness that causes the brightness of the first area not to reach an upper and lower saturation point based on the detected brightness of the first area and brightness of the third area;

estimating, for a fourth area of the second image that is an area associated with the second area in accordance with the correspondence, a range of second brightness that causes the brightness of the second area not to reach an upper and lower saturation point based on the detected brightness of the second area and brightness of the fourth area;

adjusting brightness of a fifth area corresponding to the third area in a projection image projected form the projector so as to fall within the range of the first brightness and adjusting brightness of a sixth area corresponding to the fourth area in the projection image so as to fall within the range of the second brightness;

measuring a three-dimensional shape of the projection receiving object based on a third captured image produced by causing the first camera to capture an image of the projection receiving object with the projection image projected thereon and a fourth captured image produced causing a second camera different from the first camera to capture an image of the projection receiving object with the projection image projected thereon.

7. A measurement method comprising:

identifying correspondence between a projector coordinate system indicating a position in a first image and a camera coordinate system indicating a position in a first captured image based on the first image and the first captured image, the first captured image being produced by causing a first camera to capture an image of a projection receiving object with the first image projected thereon from a projector;

detecting brightness of a first area of a second captured image and brightness of a second area of the second captured image produced by causing the first camera to capture an image of the projection receiving object with a second image projected thereon from the projector;

estimating, for a third area of the second image that is an area associated with the first area in accordance with the correspondence, a range of first brightness that causes the brightness of the first area not to reach an upper and lower saturation point based on the detected brightness of the first area and brightness of the third area;

estimating, for a fourth area of the second image that is an area associated with the second area in accordance with the correspondence, a range of second brightness that causes the brightness of the second area not to reach an upper and lower saturation point based on the detected brightness of the second area and brightness of the fourth area;

adjusting brightness of a fifth area corresponding to the third area in a projection image projected form the projector so as to fall within the range of the first brightness and adjusting brightness of a sixth area corresponding to the fourth area in the projection image so as to fall within the range of the second brightness; and measuring a three-dimensional shape of the projection receiving object based on the projection image and a third captured image produced by causing the first camera to capture an image of the projection receiving object with the projection image projected thereon.

* * * * *